US011247522B2

(12) United States Patent
Lacaze et al.

(10) Patent No.: US 11,247,522 B2
(45) Date of Patent: Feb. 15, 2022

(54) VEHICLE CAPABLE OF MULTIPLE VARIETIES OF LOCOMOTION

(71) Applicant: Robotic Research OpCo, LLC, Clarksburg, MD (US)

(72) Inventors: Alberto Daniel Lacaze, Potomac, MD (US); Karl Nicholas Murphy, Rockville, MD (US)

(73) Assignee: Robotic Research OpCo, LLC, Clarksburg, MD (US)

(*) Notice: Subject to any disclaimer, the term of this patent is extended or adjusted under 35 U.S.C. 154(b) by 83 days.

(21) Appl. No.: 15/794,944

(22) Filed: Oct. 26, 2017

(65) Prior Publication Data
US 2018/0117980 A1 May 3, 2018

Related U.S. Application Data

(60) Provisional application No. 62/413,474, filed on Oct. 27, 2016.

(51) Int. Cl.
*B60F 5/02* (2006.01)
*B64C 39/02* (2006.01)
(Continued)

(52) U.S. Cl.
CPC .............. *B60F 5/02* (2013.01); *B60F 3/0015* (2013.01); *B60F 3/0038* (2013.01);
(Continued)

(58) Field of Classification Search
CPC .......... B60F 5/02; B60F 5/003; B60F 3/0015; B64C 2201/205; B64C 2201/208;
(Continued)

(56) References Cited

U.S. PATENT DOCUMENTS 2,702,171 A  2/1955  Katzenberger
3,053,480 A * 9/1962  Vanderlip ............... B64C 27/54
                                              244/17.13
(Continued)

FOREIGN PATENT DOCUMENTS

CN  102050167 A   9/2010
EP    3459831 A1  11/2017
(Continued)

OTHER PUBLICATIONS

Kashmir Hill, "Joggobot, The Companion Drone That Makes You Run Faster, Longer, Harder", Forbes.com, Jun. 7, 2012; accessed from https://www.forbes.com/sites/kashmirhill/2012/06/07/joggobot-the-companion-drone-that-makes-you-run-faster-longer-harder/#34124f3d39e5; accessed on Sep. 30, 2019 (Year: 2012).*
(Continued)

*Primary Examiner* — Nicholas McFall
(74) *Attorney, Agent, or Firm* — RowanTree Law Group, PLLC; Carson C. K. Fincham

(57) ABSTRACT

A vehicle capable of multiple varieties of locomotion having a main body; a plurality of motors and blades providing flying capability; each motor being associated with and powering a blade assembly; two legs extending from opposing sides of the main body creating a ground propulsion system. The ground propulsion system having two legs; each leg connected to a track body at the opposing leg end; each track body comprised of a plurality of drive gears; each track body connected to and retaining a track providing ground propulsion. The vehicle can either drive or fly based on its base structure, in additional to carrying a payload. The payload is carried below the main body of the vehicle and between the tracks or running gear. When the vehicle is in flight, the tracks are able to rotate up into a fly/flight mode to protect the blades during flight.

12 Claims, 4 Drawing Sheets

(51) Int. Cl.
| | |
|---|---|
| *B62D 55/12* | (2006.01) |
| *B62D 55/30* | (2006.01) |
| *B62D 57/04* | (2006.01) |
| *B64C 27/20* | (2006.01) |
| *B64C 25/38* | (2006.01) |
| *B62D 55/02* | (2006.01) |
| *B60F 3/00* | (2006.01) |
| *B60F 5/00* | (2006.01) |
| *B64C 27/08* | (2006.01) |
| *B64F 1/00* | (2006.01) |

(52) U.S. Cl.
CPC ............ *B60F 3/0061* (2013.01); *B60F 5/003* (2013.01); *B62D 55/02* (2013.01); *B62D 55/12* (2013.01); *B62D 55/30* (2013.01); *B62D 57/04* (2013.01); *B64C 25/38* (2013.01); *B64C 27/08* (2013.01); *B64C 27/20* (2013.01); *B64C 39/024* (2013.01); *B64F 1/007* (2013.01); *B64C 2201/027* (2013.01); *B64C 2201/042* (2013.01); *B64C 2201/108* (2013.01); *B64C 2201/128* (2013.01); *B64C 2201/141* (2013.01); *B64C 2201/205* (2013.01); *B64C 2201/208* (2013.01); *B64D 2211/00* (2013.01)

(58) Field of Classification Search
CPC ........ B64C 2201/027; B64C 2201/108; B64C 2201/127; B64C 2201/128; B64C 27/54; B64C 27/57; B64C 37/00
See application file for complete search history.

(56) References Cited

U.S. PATENT DOCUMENTS

| | | | | |
|---|---|---|---|---|
| 3,306,250 | A * | 2/1967 | Pitchford | B60F 3/0015 440/12.54 |
| 7,069,124 | B1 | 6/2006 | Whittaker et al. | |
| 7,186,567 | B1 | 3/2007 | Sutherland | |
| 7,398,946 | B1 | 7/2008 | Marshall | |
| 8,167,234 | B1 | 5/2012 | Moore | |
| 8,342,440 | B2 | 1/2013 | Papanikolopoulos | |
| 8,639,400 | B1 * | 1/2014 | Wong | A63H 30/04 244/17.13 |
| 9,108,479 | B1 * | 8/2015 | Calvert | B60F 5/02 |
| 9,145,207 | B2 | 9/2015 | Moschetta | |
| 9,216,745 | B2 | 12/2015 | Beardsley et al. | |
| 9,447,448 | B1 | 9/2016 | Kozloski | |
| 9,550,400 | B2 | 1/2017 | Hutson | |
| 9,611,038 | B2 | 4/2017 | Dahlstrom | |
| 9,770,703 | B1 | 9/2017 | Soliz | |
| 9,928,749 | B2 | 3/2018 | Gil | |
| 9,963,230 | B2 | 5/2018 | Borman | |
| 10,126,126 | B2 | 11/2018 | Clark | |
| 10,540,901 | B2 | 1/2020 | Clark | |
| 10,730,626 | B2 | 8/2020 | Gil | |
| 10,775,792 | B2 | 9/2020 | Cooper | |
| 10,872,534 | B2 | 12/2020 | Clark | |
| 2002/0060267 | A1 | 5/2002 | Yavnai | |
| 2004/0012491 | A1 | 1/2004 | Kulesz | |
| 2005/0003715 | A1 * | 1/2005 | Hewitt | B60F 3/0015 440/12.5 |
| 2005/0004723 | A1 | 1/2005 | Duggan et al. | |
| 2005/0027412 | A1 | 2/2005 | Hobson | |
| 2006/0187017 | A1 | 8/2006 | Kulesz | |
| 2006/0190134 | A1 | 8/2006 | Ziegler | |
| 2007/0228214 | A1 * | 10/2007 | Horak | A63H 27/14 244/63 |
| 2008/0048065 | A1 | 2/2008 | Kuntz | |
| 2008/0311894 | A1 | 12/2008 | Klein | |
| 2009/0228355 | A1 | 9/2009 | Dawson | |
| 2010/0193626 | A1 | 8/2010 | Goossen | |
| 2011/0061951 | A1 | 3/2011 | Gal | |
| 2011/0226898 | A1 | 9/2011 | Smith | |
| 2012/0185129 | A1 | 7/2012 | Carrier | |
| 2012/0214550 | A1 | 8/2012 | Galaro | |
| 2013/0062153 | A1 | 3/2013 | Ben-Tzvi | |
| 2014/0034775 | A1 | 2/2014 | Hutson | |
| 2014/0034776 | A1 | 2/2014 | Hutson | |
| 2014/0131507 | A1 | 5/2014 | Kalantari | |
| 2014/0252166 | A1 | 9/2014 | Smith | |
| 2014/0303814 | A1 | 10/2014 | Burema | |
| 2015/0014475 | A1 * | 1/2015 | Taylor | B64C 39/024 244/6 |
| 2015/0136902 | A1 * | 5/2015 | Green | B64C 25/34 244/103 R |
| 2015/0274294 | A1 | 10/2015 | Dahlstrom | |
| 2016/0023755 | A1 * | 1/2016 | Elshafei | G08G 5/025 244/17.13 |
| 2016/0114887 | A1 | 4/2016 | Zhou | |
| 2016/0130000 | A1 * | 5/2016 | Rimanelli | B64C 39/024 244/2 |
| 2016/0144358 | A1 | 5/2016 | Patel | |
| 2016/0207637 | A1 * | 7/2016 | Campillo | B64C 39/024 |
| 2016/0368549 | A1 * | 12/2016 | Davis | B60F 3/0015 |
| 2017/0113797 | A1 * | 4/2017 | Hogan | B64C 37/00 |
| 2017/0144771 | A1 * | 5/2017 | Lukaczyk | B64C 11/00 |
| 2017/0199979 | A1 | 7/2017 | Reiner | |
| 2017/0225802 | A1 * | 8/2017 | Lussier | B64F 1/00 |
| 2017/0234834 | A1 | 8/2017 | Briglin | |
| 2018/0044000 | A1 * | 2/2018 | Venturelli | B64C 25/405 |
| 2018/0074488 | A1 * | 3/2018 | Cantrell | B64C 39/024 |
| 2018/0079268 | A1 * | 3/2018 | Sato | B60F 3/00 |
| 2018/0173245 | A1 * | 6/2018 | Twining | B64D 45/00 |
| 2018/0180564 | A1 | 6/2018 | Farhart | |
| 2019/0009756 | A1 | 1/2019 | Jacobs | |
| 2019/0055018 | A1 * | 2/2019 | Bei | B64C 39/024 |
| 2019/0174208 | A1 | 6/2019 | Speicher | |
| 2020/0406773 | A1 | 12/2020 | Lacaze | |

FOREIGN PATENT DOCUMENTS

| | | | | |
|---|---|---|---|---|
| FR | 2587909 A1 | 9/1986 | | |
| FR | 3036379 A1 * | 11/2016 | ............ | B64C 27/54 |
| FR | 3036379 A1 | 11/2016 | | |
| RU | 2166427 C2 | 9/2000 | | |

OTHER PUBLICATIONS

Wikipedia, "Unmanned Aerial Vehicle", https://en.wikipedia.org/wiki/Unmanned_aerial_vehicle; archived by Internet Archive on Feb. 4, 2016; https://web.archive.org/web/20160204212920/https://en.wikipedia.org/wiki/Unmanned_aerial_vehicle#Autonomy; accessed Sep. 30, 2019 (Year: 2016).*
Tom Spendlove, "B-Unstoppable, the Tank Drone Hybrid", engineering.com, posted Jun. 18, 2015; https://www.engineering.com/PLMERP/ArticleID/10288/B-Unstoppable-the-Tank-Drone-Hybrid.aspx, accessed Sep. 20, 2019 (Year: 2015).*
Office Action for U.S. Appl. No. 16/547,977 dated Feb. 17, 2021; 8 pgs.
Notice of Allowance for U.S. Appl. No. 16/547,977 dated Mar. 5, 2020; 35 pgs.
AAM, "Aerial Survey & LiDAR", http://www.aamgroup.com/services-and-technology/aerial-survey; archived by Internet Archive on Mar. 7, 2016; https://web.archive.org/web/20160307161714/http://www.aamgroup.com/services-and-technology/aerial-survey; accessed Sep. 30, 2019 (Year: 2016).
Office Action for U.S. Appl. No. 15/794,931 dated Oct. 3, 2019, 38 pp.
Final Office Action for 15/794,931 dated Mar. 5, 2020; 24 pps.
Office Action for 15/794,931 dated Jul. 24, 2020; 31 pps.
Office Action for U.S. Appl. No. 15/908,376 dated Aug. 30, 2018; 10 pps.
Final Office Action for U.S. Appl. No. 15/908,376 dated Mar. 11, 2019; 10 pps.
Mccloud, "Belts and Pulleys", Jun. 14, 2014; 7 pps.
Office Action for U.S. Appl. No. 16/566,788 dated Oct. 10, 2019; 9 pps.

(56) References Cited

OTHER PUBLICATIONS

Final Office Action for U.S. Appl. No. 16/566,788 dated Feb. 25, 2020; 9 pps.
Office Action for U.S. Appl. No. 14/928,648 dated Feb. 22, 2017; 17 pps.
Final Office Action for U.S. Appl. No. 14/928,648 dated Aug. 30, 2017; 11 pps.
English language Abstract of FR2587909A1.
English language Abstract of RU2166427.
English language Abstract of CN102050167A.
English language Abstract of FR3036379A1.

* cited by examiner

VEHICLE CAPABLE OF MULTIPLE VARIETIES OF LOCOMOTION

CROSS-REFERENCE TO RELATED APPLICATIONS

This application claims priority to, and is a Non-provisional of, U.S. Provisional Patent Application No. 62/413,474, entitled "Vehicle Capable of Multiple Varieties of Locomotion", filed on 27 Oct. 2016.

This application is related to U.S. patent application Ser. No. 14/928,648, entitled "Vehicle Capable of Multiple Varieties of Locomotion", filed on 30 Oct. 2015, which itself claims priority to and is a Non-Provisional of U.S. Provisional Patent Application No. 62/072,811, entitled "Vehicle Capable of Multiple Varieties of Locomotion", and filed on 30 Oct. 2014.

TECHNICAL HELD OF THE INVENTION

The present invention relates generally to a vehicle capable of multiple varieties of locomotion. More specifically, the present invention relates to a vehicle that is capable of utilizing different methods of movement by rotating its propellers to accommodate air, ground, or water locomotion.

BACKGROUND OF THE INVENTION

Quadrotors and hex rotors have revolutionized a variety of applications, including toys, the delivery of goods, or the delivery of devices and information in the battlefield. Although the ability to fly allows such devices to reach locations that are inaccessible to ground vehicles, there are locations where ground vehicles are still best suited for a given task.

For example, a policeman involved in a hostage situation may like to have a flying vehicle capable of traversing an open doorway; however, he may then prefer to possess a ground vehicle for traversing the indoors of the building in search of the suspect. A combination between air and ground vehicles would be better suited for this mission. In particular, such a vehicle would be able to provide a significantly longer work time, since the ground vehicle consumes significantly less energy than the quadrotor. Similar levels of efficiency can be found with a quadrotor that becomes an air-boat. In the next section, we will present different embodiments of the invention.

Definitions

An autonomous vehicle (driverless car, self-driving car, robotic car, and robotic drone) is a vehicle that is capable of sensing its environment and navigating without human input. Autonomous vehicles can detect surroundings using a variety of techniques such as radar, LIDAR, GPS, odometry, and computer vision. Advanced control systems interpret sensory information to identify appropriate navigation paths, as well as obstacles and relevant signage. Autonomous vehicles have control systems that are capable of analyzing sensory data to distinguish between different objects and obstacles, which is very useful in planning a path to the desired destination.

Connected vehicles are vehicles that use any of a number of different communication technologies to communicate with the driver, other cars on the road (vehicle-to-vehicle [V2V]), roadside infrastructure (vehicle-to-infrastructure [V21]), and the "Cloud." This technology can be used to not only improve vehicle safety, but also to improve vehicle efficiency and commute times.

Continuous track, also called tank tread or caterpillar track, is a system of vehicle propulsion in which a continuous band of treads or track plates is driven by two or more wheels.

The GPS (Global Positioning System) is a "constellation" of approximately 30 well-spaced satellites that orbit the Earth and make it possible for people with ground receivers to pinpoint their geographic location. The location accuracy is anywhere from 100 to 10 meters for most equipment. Accuracy can be pinpointed to within one (1) meter with special military-approved equipment. GPS equipment is widely used in science and has now become sufficiently low-cost so that almost anyone can own a GPS receiver.

Hot swapping and hot plugging are terms used to describe the functions of replacing computer system components without shutting down the system. More specifically, hot swapping describes replacing components without significant interruption to the system, while hot plugging describes the addition of components that would expand the system without significant interruption to the operation of the system. Once the appropriate software is installed on the computer, a user can plug and unplug the component without rebooting. A well-known example of this functionality is the Universal Serial Bus (USB) that allows users to add or remove peripheral components such as a mouse, keyboard, or printer.

An inertial measurement unit (IMU) is an electronic device that measures and reports a body's specific force, angular rate, and sometimes the magnetic field surrounding the body, using a combination of accelerometers and gyroscopes, sometimes also magnetometers. IMUs are typically used to maneuver aircraft, including unmanned aerial vehicles (UAVs), among many others, and spacecraft, including satellites and lenders. Recent developments allow for the production of IMU-enabled GPS devices. An IMU allows a GPS receiver to work when GPS-signals are unavailable, such as in tunnels, inside buildings, or when electronic interference is present. A wireless IMU is known as a WIMU.

Lidar (also called LIDAR, LiDAR, and LADAR) is a surveying method that measures distance to a target by illuminating that target with a laser light. The name LIDAR, sometimes considered an acronym of Light Detection And Ranging, (sometimes Light Imaging, Detection, And Ranging), was originally a portmanteau of light and radar. Lidar is popularly used to make high-resolution maps, with applications in geodesy, geomatics, archaeology, geography, geology, geomorphology, seismology, forestry, atmospheric physics, laser guidance, airborne laser swath mapping (ALSM), and laser altimetry. Lidar sometimes is called laser scanning and 3D scanning, with terrestrial, airborne, and mobile applications.

Payload is the carrying capacity of an aircraft or launch vehicle, usually measured in terms of weight. Depending on the nature of the flight or mission, the payload of a vehicle may include cargo, passengers, flight crew, munitions, scientific instruments or experiments, or other equipment. Extra fuel, when optionally carried, is also considered part of the payload. In a commercial context (i.e., an airline or air freight carrier), payload may refer only to revenue-generating cargo or paying passengers. There is a natural trade-off between the payload and the range of an aircraft.

Radar is an acronym for "radio detection and ranging." A radar system usually operates in the ultra-high-frequency (UHF) or microwave part of the radio-frequency (RF)

spectrum, and is used to detect the position and/or movement of objects. Radar can track storm systems, because precipitation reflects electromagnetic fields at certain frequencies. Radar can also render precise maps. Radar systems are widely used in air-traffic control, aircraft navigation, and marine navigation.

An unmanned aerial vehicle (UAV), commonly known as a drone, as an unmanned aircraft system (UAS), or by several other names, is an aircraft without a human pilot aboard. The flight of UAVs may operate with various degrees of autonomy: either under remote control by a human operator, or fully or intermittently autonomously, by onboard computers.

An unmanned ground vehicle (UGV) is a vehicle that operates while in contact with the ground and without an onboard human presence. UGVs can be used for many applications where it may be inconvenient, dangerous, or impossible to have a human operator present.

ELEMENT LIST

Main body 101
Tracks 103
Payload 102
Blades 104, 121-124
Main body shell 105
Batteries 106
Flight motors 107, 108, 125-128
Transformation motor 111
Head 109
Top joint 110
Bottom joint 116
LADAR 112
Ground propulsion mechanism 115
Legs 120
Wheels 113
Track frame 131
Track tensioner 114
Concave bend 130
Hard stops 133, 134
Suspension system 119
Leaf spring, shock and damper 137
Charging mechanism, charging port, closing pin 139
Gears 140
Upper Linkage 129
Bottom Linkage 132
Two or three track embodiment 143
Solar panels 141

SUMMARY OF THE INVENTION

The present invention is a vehicle capable of multiple varieties of locomotion comprising: a main body; a plurality of flight motors and blades providing flying capability; each flight motor being associated with and powering a blade assembly; two legs extending from opposing sides of the main body creating a ground propulsion system. The ground propulsion system comprised of two legs; and a track body connected at the end of each leg; each track body comprised of a plurality of track motors; each track body connected to and retaining a track providing ground propulsion; and the vehicle of the present invention can drive and/or fly based on its base structure, in additional to carrying a payload.

The payload is carried below the main body of the vehicle and between the tracks, the center of gravity is critical. When the vehicle is in flight, the tracks are able to rotate up into a fly/flight mode to protect the blades during flight. In the ground mode, the main body shell is supported by the tracks. The batteries powering the flight motors are located under the main body as well for reducing the center of gravity.

When in flight mode, the vehicle has the tracks rotated up to protect the blades and the battery and payload, if so equipped, hang below the main body shell, tracks, flight motors, and blades. The transformation motor that raises the tracks of the vehicle of the present invention is servo based. This allows the raised assembly to be placed at any angle, not a limited amount of set positions/angles.

BRIEF DESCRIPTION OF THE DRAWINGS

The accompanying drawings, which are incorporated herein a form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Now referring to the Figures, the present invention and various embodiments are illustrated. The present invention is a vehicle capable of multiple varieties of locomotion, those being a drive mode and a fly mode. The vehicle of the present invention can drive and/or fly based on its base structure, in addition to carrying a payload 102.

Figure 1:
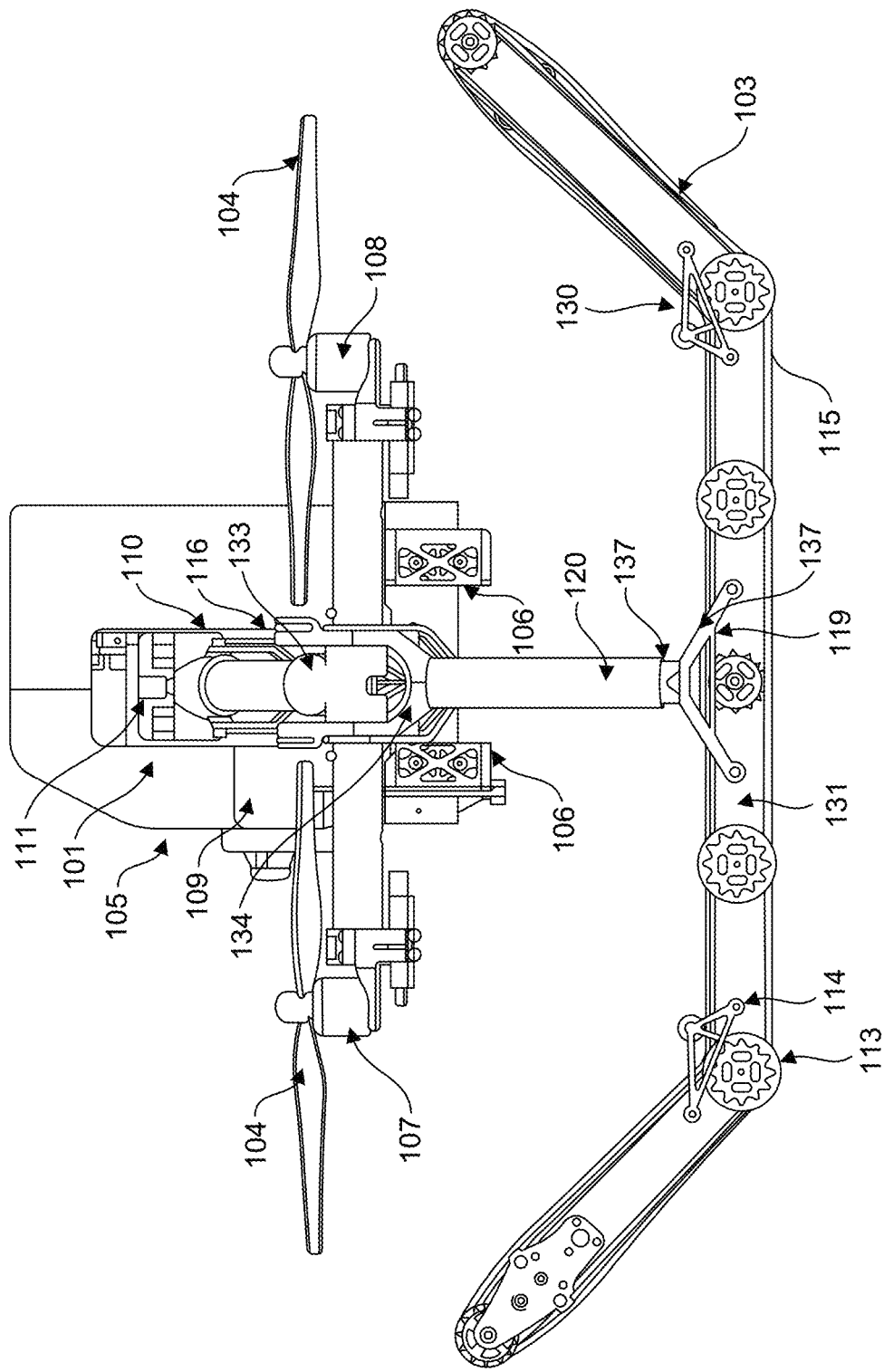
FIG. 1 is a side view of a single blade vehicle of the present invention.
Figure 2:
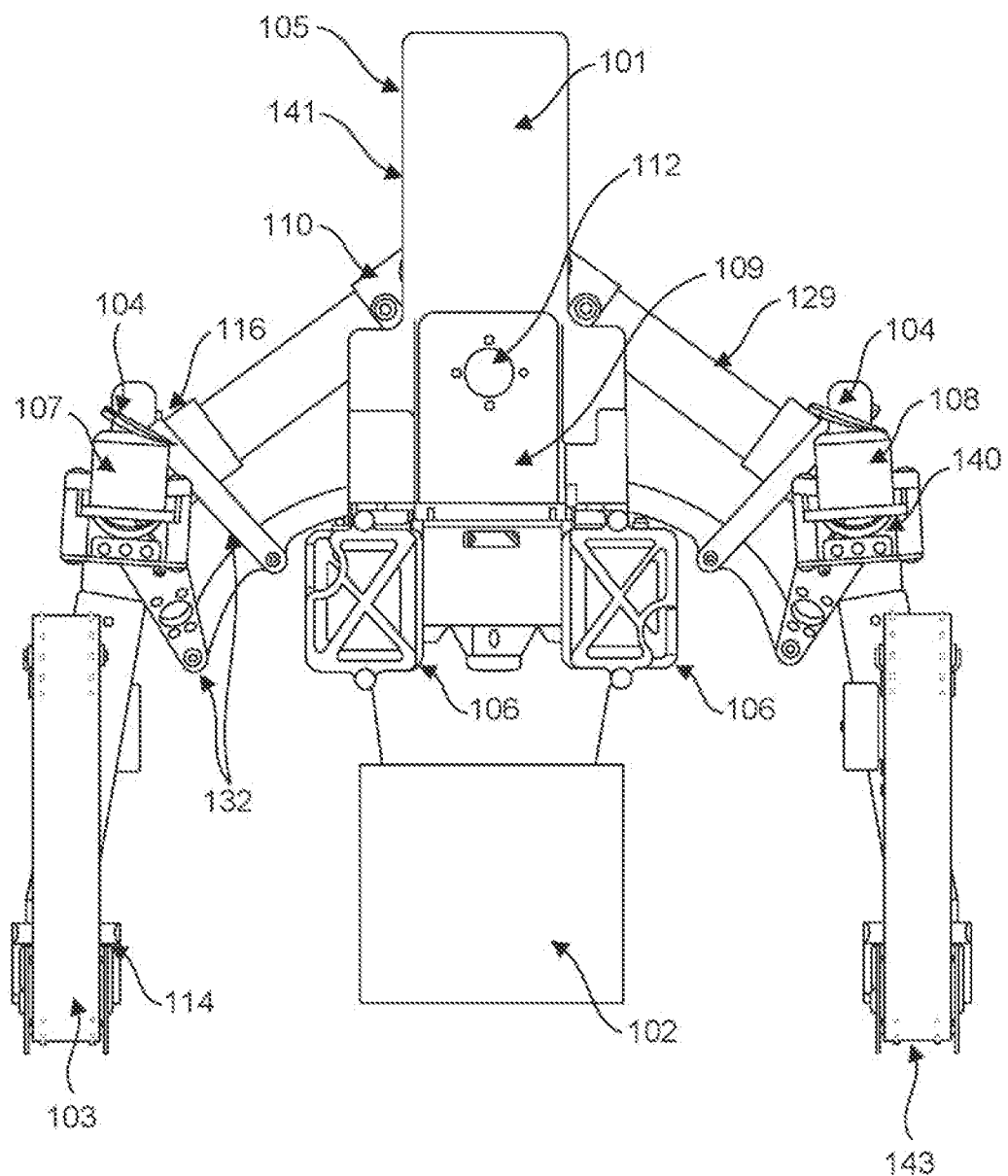
FIG. 2 is a front view of a single blade vehicle of the present invention.

With respect to the payload 102, which is carried below a main body 101 of the vehicle and between tracks 103, the center of gravity is critical. With respect to FIGS. 2 and 3, the payload 102 is secured to the main body 101 and hangs underneath it, contributing to a lower center of gravity. The lower center of gravity can be made, the more stable the vehicle will be in and during the flight mode. The tradeoff is that the larger the payload 102, due to its location, results in a loss of ground clearance when in the drive mode.

When the vehicle is in flight, the tracks 103 are able to rotate up into a fly/flight mode to protect blades 104 during flight.

A main body shell 105 is supported by the tracks 103. This results in a vehicle that has a larger ground clearance compared to others currently being developed.

Batteries 106 powering flight motors 107 and 108 are located under the main body 101 as well for reducing the center of gravity. The batteries 106 and the payload 102 represent the most significant components that contribute to the overall weight of the vehicle.

When in flight mode, the vehicle has the tracks 103 rotated up to protect the blades 104 and the battery 106 and payload 102, if so equipped, hang below the main body shell 105, tracks 103, flight motors 107 and 108, and blades 104. In this configuration, the lower (z plane) and centrally located (with respect to the x and y planes) the center of gravity is, it acts like a pendulum and keeps the vehicle stable in various conditions.

Another advantage of the tracks 103 being rotated up is that this movement enables a 360 degree view off a bottom mounted camera, when a camera is the payload 102.

Additionally, in flight mode, the weight of the tracks 103 is moved above a head 109 at a top joint 110, while the weight of the batteries 106 and any payload 102 remain below the head 109, along with their weight.

Transformation motor(s) 111 that raise the tracks 103 of the vehicle of the present invention are servo based. Typically, in a vehicle capable of multiple varieties of locomotion, the transformation motor 111 must be in one of only two fixed positions. In the present invention, the use of the transformation motor (e.g., a servo) 111 allows the raised assembly (e.g., the tracks 103) to be placed at any angle, not a limited amount of set positions/angles.

In a specialized embodiment, the vehicle can carry an unmanned air vehicle (UAV) or an unmanned ground vehicle (UGV)—not separately depicted; e.g., the payload 102. In this embodiment, the vehicle can fly and drive, and also deliver an additional UAV or UGV to a location by air, land, water, or any combination thereof. The vehicle of the present invention can be built to have the same functionality in various degrees of durability by altering the materials and size and strength of its component parts. This means the vehicle can range in size/weight from 120 to 5 pounds, but retain the same functionality and various payload capacities ranging from delivering batteries to containers.

The combined UAV and UGV functionality also allows the vehicle to operate as a multi-vehicle system, where the vehicle can travel and land, then allow the UAV or UGV to carry out its function, which could be anything from delivering a secondary payload (not separately depicted) by air or ground to a secondary location. For example, a pizza or package delivery could be completed where the vehicle flies to a street or intersection, and then the UAV or UGV delivers the package to a specific location at that street or intersection, in a multi-step, multi-vehicle situation.

In an autonomous embodiment, the vehicle of the present invention is comprised of a plurality of sensors including LADAR 112 in both single line and multiple line embodiments. The vehicle can use the LADAR 112 to provide mapping and obstacle detection. In this embodiment, the vehicle would be in fly mode using a single line LADAR to provide obstacle detection and two-dimensional mapping. A front facing LADAR 112 provides horizontal line information while a rear sensor (not separately depicted) provides vertical line information.

One issue facing vehicle control and mapping is sensor "wobble", which occurs during normal flight or ground exercises. When the sensors (e.g., the LADAR 112) wobble accuracy is diminished and mapping can become blurred. To solve this issue, in a ground mode, during autonomous operation, the vehicle uses its sensors (e.g., the LADAR 112) to provide mapping in the direction it is moving or to its front, while using LADAR 112 to detect the ground so that a correction can be made as the vehicle is in motion.

In another embodiment, the present invention can be equipped with ranging radios (not separately depicted). Ranging radios can be used to measure the distance between the vehicle and other objects (not shown) in its environment. In some situations, this can be used to monitor and maintain a specific distance between the vehicle and a walker/pedestrian or another vehicle.

In one specific embodiment of the present invention, a plurality of ranging radios can be placed on each of the four corners of another vehicle (not shown), which could be stationary or in motion itself. The four ranging radios then provide corner information to the vehicle so that the vehicle can land on it.

Currently, many UAVs will follow each other in a platooning type situation and merely execute a program to maintain direction and proximity, or they may even rely on GPS information to maintain and adjust their movement, but this does not work in a GPS-denied embodiment, and does not overcome many of the current shortcomings.

For example, it is currently very difficult to correctly find and control a vehicle and have it follow another vehicle if they are out of sight of the operator. The present invention, using ranging radios, can place the vehicle not just in the area of another vehicle, person, or combination thereof, but it can follow that target based on the information provided to it by the ranging radios. Additionally, multiple vehicles, each equipped with their own ranging radio can find each other using the ranging radios and then communicate with each other.

In the ranging radio embodiment, the one or more vehicles can maintain complete functionality using only the sensors it is carrying and any additional information received from ranging radios detectable to it. In this embodiment, the need for a GPS signal or any GPS information is removed and the vehicles will still be able to determine and know their location(s). Additionally, a software method has been developed to control and use the information in the proper manner.

In another embodiment, the vehicle of the present invention can be used to gather visual information in a live stream format to be combined with model data for viewing by an operator or other interested parties at one or more remote locations from the vehicle. In this embodiment, the vehicle is equipped with a single line sensor (e.g., the LADAR 112) for mapping and the vehicle is rotated around the environment for continuous, real-time mapping. This data and information would be very difficult for an operator or other interested party to view. For the operator, the information would make orientation of the vehicle and subsequent control and maneuverability very difficult as location and orientation based on a such information would be difficult to remember and control of direction and location quickly lost or confused by the operator. Equally, any third party viewer would have the same orientation issues with respect to the information.

In an effort to make the information collected by the vehicle more valuable and user friendly, the vehicle's continuous visual data is combined with a 3D model of the location and the real time data is projected onto the 3D model (like a table cloth covering a table). This projection of real time visual data onto the model makes many things possible. Now the operator and any third party viewer are not looking at two-dimensional graphical information, but three-dimensional information. This allows the operator to better control the vehicle and to avoid obstacles and identify and find better travel or following paths around the environment.

Additionally, the information can be used to provide the automatic tracking of people and objects. In this application of the information, the movement of people and objects can be combined or added to the visual representation being show so that the visualization is not a composite of live information and past or historical information on the movement of people or objects. This can be beneficial in many settings, one being military applications for tracking people and objects or identifying new or replaced objects in a setting that could represent hidden bombs, mines, or other explosives.

In yet another embodiment the vehicle can be equipped with the LADAR 112 or acoustical detectors.

Now, focusing on the blades 104 used by the vehicle of the present invention, the blades 104 are used in fly mode, but could also be used in a drive mode if the vehicle where on ice, water, or in another situation where additional ground propulsive force or propulsive ground force, not coming from the tracks 103 or in combination with the tracks 103 is desired.

A ground propulsion mechanism 115, as shown in the figures, provides a means of track type propulsion similar to that of a tank via the tracks 103. Continuous track 103, also called tank tread or caterpillar track, is a system of vehicle propulsion in which a continuous band of treads or track plates is driven by two or more wheels 113. In the present invention, the tracks 103 are not merely wrapped around wheels 113, but they also include and require an additional component (a track tensioner 114) to retain the track 103 against the wheels 113 since, the track 103 is comprised of an angle under 90 degrees, which would cause the track 103 to pull away or separate from the wheel 113.

The ground propulsion mechanism 115 of the vehicle of the present invention is also unique in that it rotates up to protect the blades 104 when not in use. This provides a means of protection for the blades 104 when in a flight mode. Additionally, the present invention uses the transformation motor (e.g., a servo) 111 system that allows the ground propulsion mechanism 115 and tracks 103 to be raised or lowered to any angle, not just fixed positions. This provides a means for adjusting the center of gravity of the vehicle, which is very important as now the vehicle can be optimally adjusted for weight distribution for any payload 102, sensor package, or operational environmental conditions. This ability to adjust the center of gravity and provide protective coverage to the blades 104 and flight motors 107 and 108 is a novel and non-obvious combination in view of the current state of the art.

In the prior art, flying vehicles or drones, have been equipped with moving parts to control and raise the blades and engines at a different angle. The present invention improves upon these prior art devices by using the transformation motor 111 which allows any angle of adjustment compared to the prior art devices that used fixed positions of adjustment. Additionally, the present invention has a second hinge or bottom joint 116 to control and raise the tracks 103 of the ground propulsion mechanism 115 to any desired angle.

Figure 3:
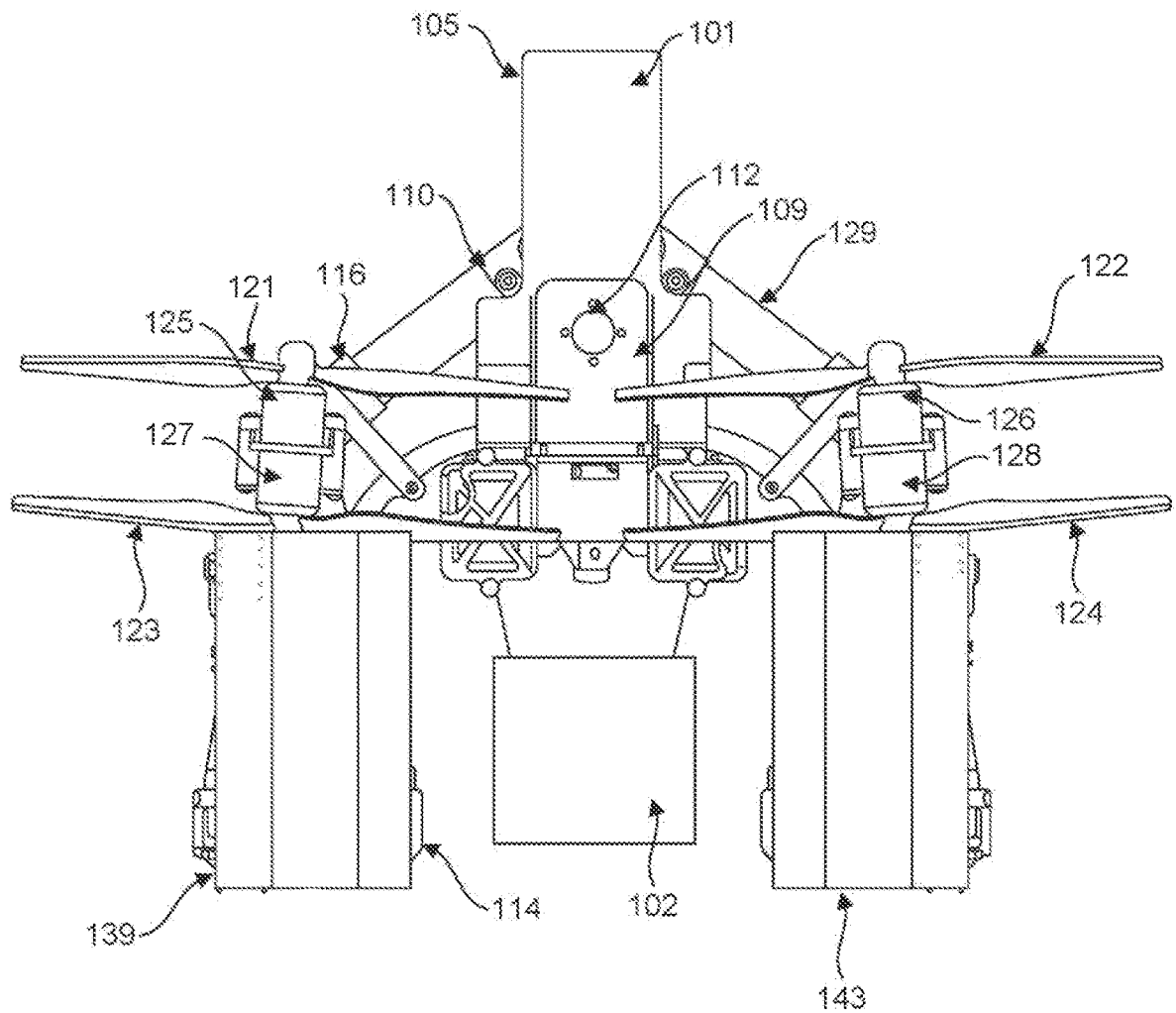
FIG. 3 is a side view of a double blade vehicle of the present invention.
Figure 4:
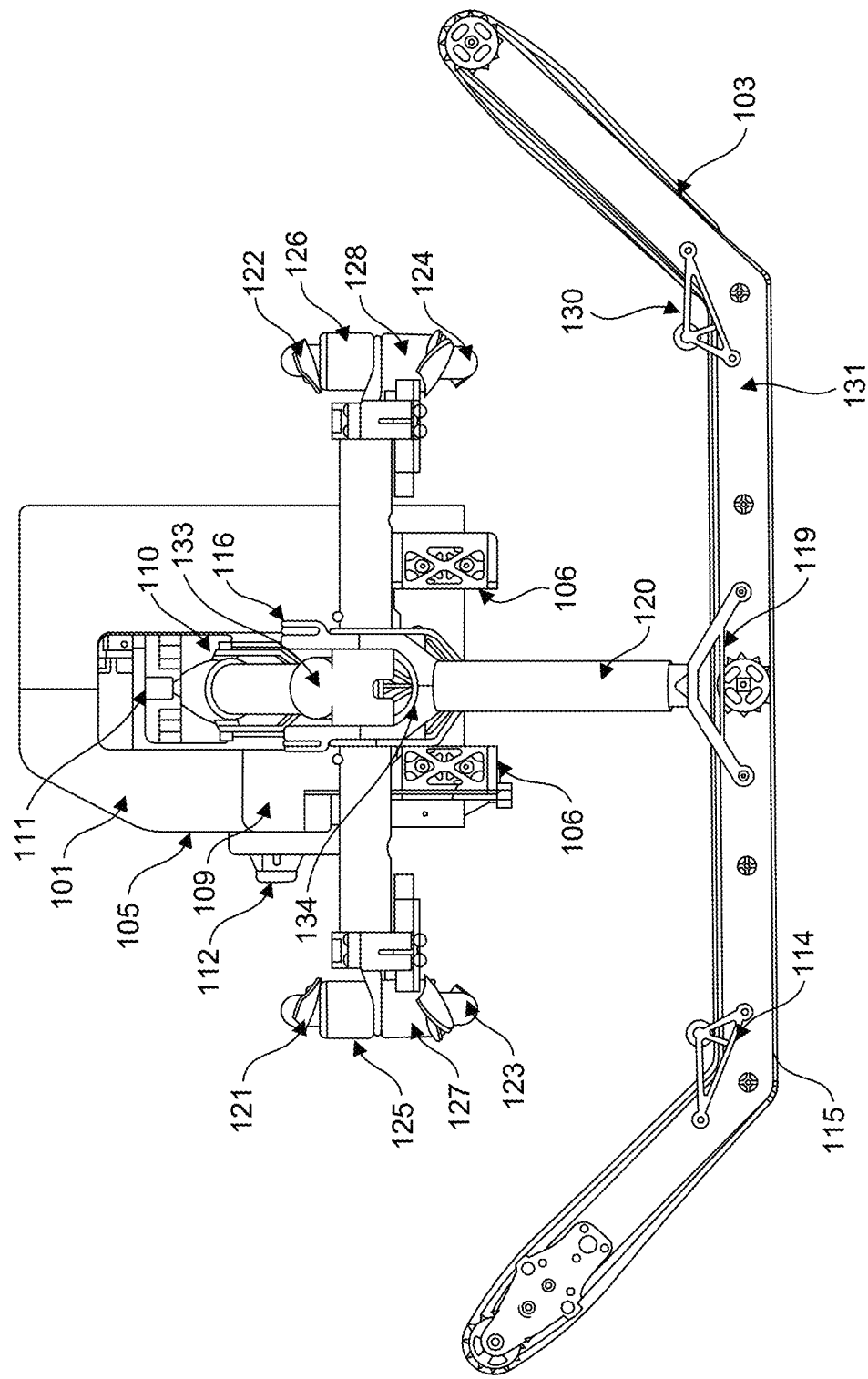
FIG. 4 is a front view of a double blade vehicle of the present invention.

In another embodiment of the present invention shown in FIGS. 3 and 4, the vehicle is equipped with a double bladed design where the more common, single blades 104 of a drone or similar vehicle are replaced/supplemented with double blades 121-124. In this embodiment, second blades 123-124, located on the bottom side of flight motors 125-128 driving the pair of bottom/lower/second blades 123-124 and the corresponding top/upper blades 121-122 located on the top side.

In yet another embodiment, the ground propulsion mechanism 115 of the present invention can be further comprised of a suspension system 119 made from a heavier resin material or carbon fiber to strengthen the vehicle. In this embodiment, the tracks 103 remain as shown in the figures, but solid legs 120 are replaced by a configuration providing the suspension system 119. The leg 120 and track 103 location, angle, and position can be adjusted to handle various landing platforms and be adjusted for various weight ranges of the vehicle with and without a payload 102.

Suspension solutions include a leaf spring design and a shock/damper design 137.

In another embodiment, the vehicle of the present invention is used in combination with a cradle (not shown) that provides a means of securing it to another vehicle or stationary position as well as providing charging capability. Landing a vehicle such as a drone or one capable of a variety of locomotion can be very difficult. Landing a flying vehicle is very difficult and often results in hard landings, or imperfect landings that can damage the vehicle or landing platform.

What is needed is a mechanical constraint with a large "sweet spot" or window for providing a successful landing. A landing platform designed in the shape of a triangle or pyramid (not shown) in the three dimensional shape/sense providers a larger margin for landing error, resulting in a larger sweet spot for a successful landing. This is due to the mechanical nature of the shape, which when combine with the legs 120 and tracks 103 of the present invention results in a self-correcting mechanical advantage once contact is made.

Upon contact between the tracks/legs 103/120 portion of the vehicle and a pyramid shaped cradle or docking station, the legs 120, angled in an inverted triangle/pyramid shape engage the pyramid shape of the cradle and, following the laws of physics, will pull themselves into each other and settle into a position of having the lowest potential energy, which is that of an inverted triangle secured between the sides of two adjacent triangles, which is a particularly stable position. The angle of the legs/cradle is in a range of zero to 10 degree and optimally about 5 degrees.

In practice, the legs 120 are moved at an angle, to a mechanically more stable location then simply straight up and down and parallel to each other. Next, as the vehicle engages the cradle, the cradle and legs 120 make contact. Here, rails of the cradle guide the tracks 103 into a track slot. A charging mechanism then makes contact with a charging port, charging mechanism, and/or closing pin 139 on the vehicle. A closing pin 139 can flip to lock and secure the tracks 103 and/or legs 120 into place against the cradle. When in the closing location, the closing pin 139 can also be equipped with a charging connection. If an imperfect landing occurs, an operator an use the tracks 103 to drive the vehicle forward or backward until the tracks 103 fall into the track retaining slots.

In a variable pitch embodiment, the vehicle is equipped with double blades 121-124 as shown in FIGS. 3 and 4. In this embodiment, an operator or software running on the vehicle can select an optimal blade pitch for the operating conditions or activity. In this embodiment, each blade 121-124 is controlled by its own, independent flight motor 125-128. The blades 123 and 124 of the second/bottom flight motor 127 and 128 are different then the first/top blades 121 and 122 of the first/top flight motor 125 and 126. Blades 121-124 are also selected based on pitch and location on the vehicle to maximize efficiency. For example, flight motor selection is then based on operating RPM as the second/bottom flight motor(s) 127-128 gets accelerated air from the first/top flight motor 125-126 and will have a different RPM and power consumption need.

Another consideration of the multi-blade embodiment is noise. The noise characteristic of the vehicle can be drastically affected by the selection of blades 121-124 based on their size, pitch, and other factors. Each blade 121-124 gives off a sound wave, which is in the spectrum for being heard by the human ear. In order to avoid a vehicle that generates a standing wave, that can be continuously heard, the flight motors 125-128 must not run in sync or at the same RPM or at an integer multiple which can also create a standing or amplified wave. The flight motors 125-128 need to be selected for RPM efficiency and arranged in a manner so that they are operated at their most efficient RPM, while not combining to create a standing wave.

In this manner, the flight motors 125-128 can be run at a very efficient rate, without having to all run at the same RPM or in a synchronized manner to have the same or an increased efficiency as those run in a more simple, synchronized manner. To accomplish this, the present invention uses a variety of ratios of gears 140 to ensure rotor rotation is not in sync or running at any multiples. An algorithm is used to calculate and determine the best combination of blade size, pitch, and flight motor RPM for the entire vehicle as a unit.

Blade angle of the vehicle of the present invention should not be horizontal as it provides for better control during landing. The present invention uses an upper linkage 129 that, when in flight, puts the blades 104 and/or 121-124 in a flat position for increased efficiency and control during flight modality. During landing, the same upper linkage 129 is used to place the blades 104 and/or 121-124 in a non-flat position, resulting in better control and handling characteristics.

Just like the wings of an most commercial airplanes are constructed with a slight upward tilt to provide better control on landing, the angle of the blades 104, 121-124 on a drone or vehicle like that of the present invention are different for performance or landing. The present invention provides a means for the angle of the blades 104 and/or 121-124 to be changed based on a plurality of modalities, two of them being landing and performance/efficiency. This angle change is done by adjusting the length of the upper linkage 129.

The tracks 103 used by the present invention for ground propulsion have a unique concave bend 130. This requires the use of the track tensioner 114 to keep them retained against a track frame 131. The track frame 131, when made from a closed cell material can also double as floats or platoons, enabling the present invention to float and move on water.

In another track embodiment, a single track 103 is replaced by a two or three track embodiment 143 where each segment of the track frame 131 has its own associated and corresponding track 103. This would eliminate the concave bend 130 in the single track embodiment.

Tracks 103 can be made out of various materials and contain various tread designs and other features such as blades or paddles.

In another embodiment, the vehicle of the present invention can incorporate solar panels 141 to charge onboard batteries 106 or provide energy directly to the components.

The present invention uses hot swappable batteries 106. The inventors use their own propriety electronics and PCBs (printed circuit boards) to enable this feature with the vehicle.

One main advantage of the present invention is that the blades 104 and 121-124 are not occluded by the tracks 103. Similar vehicles in the prior art provide for multiple locomotion, but their track or ground transportation mechanism occludes the blades hindering performance and efficiency.

In another embodiment, the linkage or legs 120 of the ground transportation mechanics 115 are not straight, but banana shaped to increase payload size. Bottom (e.g., four bar) linkage 132 used minimizes parts and enables various angles to be used rather than fixed angles.

In some embodiments, there is an excessive amount of play or looseness in the bottom linkage 132. The present invention uses hard stops 133-134 to remove this play. At the end of the range of motion, the bottom linkage 132 pulls into a hard stop 133. In drive mode a bar is used as the hard stop 133 making the vehicle more rigid. A loop hard stop 134 is used in fly mode to hard stop against the bottom linkage 132 tube's circumference. This set of hard stops 133 and 134 reduces play in both the fly and drive modes. Without the hard stops 133 and 134, the flight motors 125-128 would wiggle or vibrate, negatively impacting control. The flight motors 125-128 must be rigidly attached for control purposes.

In an operating mode, the vehicle can hold a position by using a camera as the payload 102 looking down on an object or feature and holding a position with respect to the object or feature. In this operational embodiment, a light (not separately shown; e.g., the payload 102) can also be provided to light the object or feature in which the camera is fixed on and the vehicle is holding its position on. An alternative is to use infrared (IR) illumination to located, look down on, and hold position.

In another embodiment, auto takeoff and landing controls the movement of the legs/arms 120 of the ground propulsion mechanism 115 based on an acoustic sensor, single line LADAR 112, or an inertial measurement unit (IMU)—not separately shown.

A single remote (not shown) is used to control the vehicle in both ground and fly modes. A ranging radio in the controller allows the vehicle to follow the operator, any other object with a ranging radio, or return home in a non-GPS environment.

In another embodiment using variable pitch blades, the blades 104 and 121-124 may be controlled manually by a control mechanism to adjust the pitch for noise multipliers. Although this adjustment may not be efficient, the operator could prefer to have a quieter operating vehicle, even if that means the flight motors 125-128 are working in an opposing direction to run quieter or cancel out any sound waves.

By using variable pitch blades 104 and 121-124, the flight motors 125-128 can be run at the correct RPM for their efficiency or operating range by changing pitch for performance or hovering to optimize energy consumption for performance, hovering, or in response to operating conditions. This can be done in configurations with one flight motor 107-108 or two flight motors 125-128, but not with four flight motors.

In another embodiment, the present invention can twist the blades 104, 121-124 based on velocity. Larger blades 104, 121-124 are more efficient as length is directly proportional to efficiency.

In another embodiment, crisscross blades 104, 121-124 are linked which allows for larger blades 104, 121-124 before they collide. This is not possible on multi-rotor designs. With respect to current blade sizes, this embodiment, using the mechanical connection, allows massive blade sizes to be used.

Noise cancellation is hard with multiple speeds. Active noise cancellation is easier with one flight motor 107-108 at a steady speed compared to other embodiments described herein.

In a double blade 121-124 embodiment using crisscross blades 121-124, a twist in the track/rubber band track provides counter rotation. This enables the vehicle to fly upside down easily if the operator desires such functionality. Additionally, this embodiment could "stick" to a wall or provide extra traction using the blades 121-124 when in drive mode and the surface has a low coefficient of friction.

Track motors have decoders to provide wheel geometry.

In future embodiments, the vehicle of the present invention will operate in both drive and fly modes autonomously.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A vehicle capable of multiple varieties of locomotion comprising:
   a main body;
   a plurality of flight motors coupled to the main body, each flight motor being coupled to a respective blade;
   two legs extending from opposing sides of the main body, each leg comprising, at an end distal from the main body, a ground propulsion mechanism comprising
   a track providing ground propulsion;
   wherein the ground propulsion mechanism is operable to move, by activation of a transformation motor coupled to the legs, between a ground-engaging position beneath the main body to a flight position adjacent to the blades.

2. The vehicle of claim 1, wherein the ground propulsion mechanism is further comprised of a suspension system.

3. The vehicle of claim 1, wherein the vehicle is equipped with variable pitch blades.

4. The vehicle of claim 1, wherein a propulsion plane of each blade is not horizontal.

5. The vehicle of claim 1, wherein the angle of the blades is operable to be changed by adjusting a length of a linkage.

6. The vehicle of claim 1, wherein the tracks used for ground propulsion have a concave bend and at least one track tensioner to keep the tracks retained against a track frame at the concave bend.

7. The vehicle of claim 1, wherein each track comprises at least two tracks.

8. The vehicle of claim 1, further comprising: solar panels coupled to charge onboard batteries.

9. The vehicle of claim 1, further comprising batteries.

10. The vehicle of claim 1, wherein auto takeoff and landing controls the movement of the two legs based on information received from an acoustic sensor, a single line Light Imaging, Detection, And Ranging (LIDAR), or an inertial measurement unit (IMU).

11. The vehicle of claim 1, wherein the vehicle operates in both drive and fly modes autonomously.

12. The vehicle of claim 1, wherein the vehicle comprises a payload suspended from the main body and between the opposing legs.

* * * * *